May 9, 1967  F. M. WOOD ETAL  3,319,160

FAIL INDICATION CIRCUIT FOR MAGNETIC INSPECTION SYSTEM

Filed Dec. 5, 1963

Fenton M. Wood
Alfred E. Crouch
INVENTORS

BY Arnold, Roylance & Harris

ATTORNEYS 3,319,160
FAIL INDICATION CIRCUIT FOR MAGNETIC
INSPECTION SYSTEM
Fenton M. Wood, Sugarland, and Alfred E. Crouch, Houston, Tex., assignors to American Machine & Foundry Company, New York, N.Y., a corporation of New Jersey
Filed Dec. 5, 1963, Ser. No. 328,280
13 Claims. (Cl. 324—37)

This invention relates to an apparatus for inspecting metallic members for defects and having automatic means for signaling the non-operability of the apparatus. More particularly, the invention relates to a non-destructive testing apparatus having an automatic signaling means for signaling failures in the operation of the apparatus.

In an automatic inspection system or apparatus, it is quite possible that the system could become non-operational or could become intermittently non-operational, which condition might not be immediately determined by periodic checks which would cause less than optimum inspection results. For example, in an automatic inspection device for magnetically inspecting welded pipe, the inspecting means, such as a search coil, might become either shorted or open circuited and/or the amplifier means of the inspection apparatus might fail to function properly or may function only intermittently. Periodic inspections would not be satisfactory for determining the non-operability of the system in those cases where the non-operability was intermittent and/or where it was desirable to have an automatic and immediate signal when the system was non-operable. With only routine maintenance and checking, there would be a period of incorrect response. Thus, it is deemed desirable to have an inspection system wherein there are automatic means for signaling the non-operability of the apparatus and/or for switching in another inspection unit immediately when trouble develops.

It is, therefore, an object of this invention to provide an improved automatic inspection apparatus for testing metallic members such as tubular goods for defects and having automatic means for immediately signaling the non-operability of the apparatus when that occurs.

It is another object of this invention to provide an improved automated inspection apparatus for signaling malfunctioning of the apparatus, which malfunctioning might not be detected by periodic and intermittent checking.

It is a further objective of this invention to provide an improved apparatus for inspecting metallic members, which apparatus has automatic means for signaling the non-operability of the apparatus, and which automatic means do not interfere with the normal operation of the inspecting portion of the apparatus.

Yet another object of this invention is to provide an automatic inspection apparatus for inspecting metallic members and having automatic means for signaling the non-operability of both the magnetic responsive means of the searching unit and/or the non-operability of the amplifier circuit connected thereto.

These and other objects will be obvious to those skilled in the art by reference to the description herein.

Briefly stated, this invention relates to an apparatus for inspecting metallic members, such as tubular members, for defects and having automatic means for signaling the non-operability or failure of the apparatus. To accomplish this end, means are provided for passing a magnetic field through a portion of the metallic member being inspected. This magnetic field may be either a residual magnetic field which has been placed in the metallic member prior to the inspection step or it may be an active field which is established at the time or instant of inspecting. The apparatus has magnetic responsive means, such as search coils, magnetometer coils, Hall effect transducers, or the like, which means are mounted for relative movement adjacent to that portion of the member being inspected and is adapted to produce electrical defect signals in response to variations in the magnetic field which is passing through the portion being inspected.

This magnetic responsive means is connected to the primary winding of an impedance matching transformer, hence the impedance of the primary winding is reflected into the secondary winding.

The secondary winding of the transformer is connected to an amplifier circuit. In addition, means are provided for impressing an electrical test signal on the amplifier circuit and these means can take the form of an electrical generator, oscillator, or the like.

The amplifier circuit is connected to a first indicator means which is responsive to defect signals amplified by the amplifier circuit. In addition, a second indicator means is connected to the amplifier circuit and is responsive to a reduction in voltage of the amplified test signal, which thereby indicates the non-operability of the apparatus, as will be explained hereinafter.

The generator for impressing the test signal on the amplifier circuit is so connected that a change of impedance in the secondary winding, which change results from a failure of the search coil, will cause the voltage of the test signal to be reduced. This reduction in test signal voltage is utilized to indicate the non-operability of the apparatus.

Furthermore, a failure of one of the amplifiers in the amplifier circuit would also result in a decrease in the voltage of the amplified test signal. Hence, the non-operability of the apparatus will be indicated no matter whether the failure is in the search coil, or in the amplifier circuit. There is then a double check on two possible types of failures, either of which could cause the aforesaid reduction in the voltage of the amplified test signal.

Reference to the drawings, which form a part of this disclosure, will further explain the invention. Like numerals will be used to refer to like parts.

Figure 1:
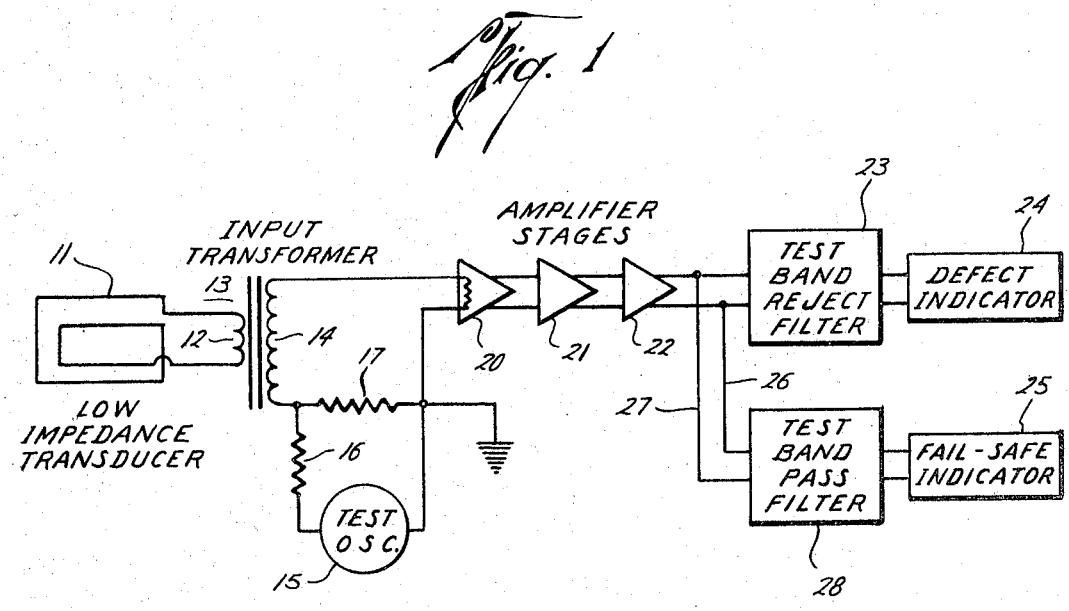
FIG. 1 is a block diagram showing one embodiment of the circuitry of the apparatus of this invention.

Referring to FIG. 1, a low impedance transducer or magnetic responsive means, which can conveniently be in the form of a small pick-up coil or search coil 11, is connected to primary winding 12 of input transformer 13 which is coupled to secondary winding 14. It is to be understood that transformer 13 is of the impedance reflecting type such that any increase or decrease in the impedance in primary winding 12 will be reflected into secondary winding 14.

Means for impressing an electrical test signal may take the form of an electrical generator and is conveniently shown as oscillator 15 which is connected to secondary winding 14 through high and low resistance resistors, conveniently shown as resistors 16 and 17.

Secondary winding 14 is also connected to an amplifier circuit conveniently shown as having a plurality of amplifier stages shown as amplifiers 20, 21 and 22 connected in series by suitable leads. Thus it may be said that oscillator 15 and secondary winding 14 are *connected in series* to the amplifier circuit.

In this embodiment oscillator 15 will impress test signals on amplifier 20 through secondary winding 14. These test signals are arranged to be of a different frequency than those significant defect signals which are generated by search coil 11 and induced in secondary winding 14. Hence it is possible to utilize filter means to separate the two types of signals after they have been amplified through the plurality of amplifier stages.

Therefore, test-band reject filter 23 is connected to amplifier 22 and is selected to reject that band of frequencies represented by the test signals impressed by oscillator 15.

A first indicator means or defect indicator 24 is connected to filter 23. This indicator may be one of any number of devices for indicating defects such as an oscilloscope, strip chart or a signal processing circuit which could be used to operate any number of indicators such as lights, bells and the like.

A second indicator means in the form of fail-safe indicator 25 is connected to the amplifier circuit at a point just ahead of test-band reject filter 23 via leads 26 and 27. Again, indicator 25 may be one of any number of different types of indicator means such as a light, a bell or the like which could be turned either off or on by means of an electrical relay switch. In some instances it may be desirable to add a test-band band-pass filter such as filter 28 just ahead of indicator 25. Filter 28 would be selected to pass that band of frequencies which represented the test signals impressed by oscillator 15, hence insuring that indicator 25 is operated only by the test signals or, more properly, by the reduction in voltage of test signals, as will be explained hereinafter.

In operation search coil 11 would be mounted for relative movement adjacent to the member being inspected such as a pipe or the like. A magnetic field would be passed through that portion of the pipe which is adjacent to search coil 11. This magnetic field could be a residual magnetic field or an active field. Moreover, coil 11 could be responsive either to flux leakage from the pipe being inspected or to variations in eddy currents induced into the pipe. For purposes of convenience, when coil 11 is used to detect variations in eddy currents, it and the associated elements for establishing eddy currents in the pipe will be referred to as an eddy current inspection unit. When coil 11 is used to detect flux leakage, it and the associated elements will be referred to as a flux leakage inspection unit. In either event, the variations in the magnetic field are utilized to produce defect signals in coil 11, which defect signals are representative of the defects detected in the member being inspected.

In the embodiment shown in FIG. 1 and as explained above, coil 11 may be a small, single turn coil of very low impedance such as 2 ohms, for example. The ratio or the turns in secondary winding 14 and primary winding 12 may, for example, be 50 to 1, hence the reflected impedance in secondary winding 14 would be relatively low and on the order of 5,000 ohms, for example. Further, as an example only, resistor 16 could have an impedance value of 10,000 ohms and resistor 17 an impedance of 10 ohms. It is to be understood that these values are dependent upon the voltage output of test oscillator 15.

Thus, with oscillator 15 connected in series as shown in FIG. 1, the test signal would be applied across secondary winding 14 to induce test signals in the amplifier circuit. The test signal would be arranged to be of a different frequency than the significant defect signals. If an open circuit should develop in coil 11, its impedance would be immediately and greatly increased, which impedance would be reflected in primary winding 12 and secondary winding 14. The result would be a voltage drop in the test signal induced in the amplifier circuit.

Furthermore, if one or more of the amplifier stages should fail there would likewise be a reduction in voltage in the output of the amplifier circuit. Thus, if there is either an open circuit in coil 11 or a failure in any one of the amplifier stages or a failure in the transformer 13, the result would be a reduction in the voltage of the amplified test signal being applied to filter 28 and indicator 25. This reduction in voltage is arranged to operate a relay switch to actuate indicator 25, thereby indicating the non-operability of the apparatus. So long as the apparatus is operating properly, the amplifier circuit will continue to transmit amplified electrical signals to defect indicator 24 via filter 23. Since the test signal applied by oscillator 15 is selected to be of a different frequency than the frequency of the defect signals detected by coil 11, test-band-reject filter 23 will reject the unwanted test signals. Hence defect indicator 24 will only be actuated by defect signals and will not be adversely affected by the test signals.

The foregoing generally describes one embodiment of the invention wherein there is provided an automatic means for signaling the non-operability of the apparatus. If the test signals are not being transmitted to indicator 25, then it can be presumed that there is a failure in coil 11 or the amplifier circuit. There would, of course, be no check on the operability of filter 23 or filter 28, but these units are passive elements wherein the percent or rate of failure is very low, whereas those portions of the circuit which are being checked are the active portions wherein failures are more frequent. Nevertheless, the automatic means for indicating operability or non-operability does not interfere with the normal operation of the detection and amplifying means of the invention.

Figure 2:
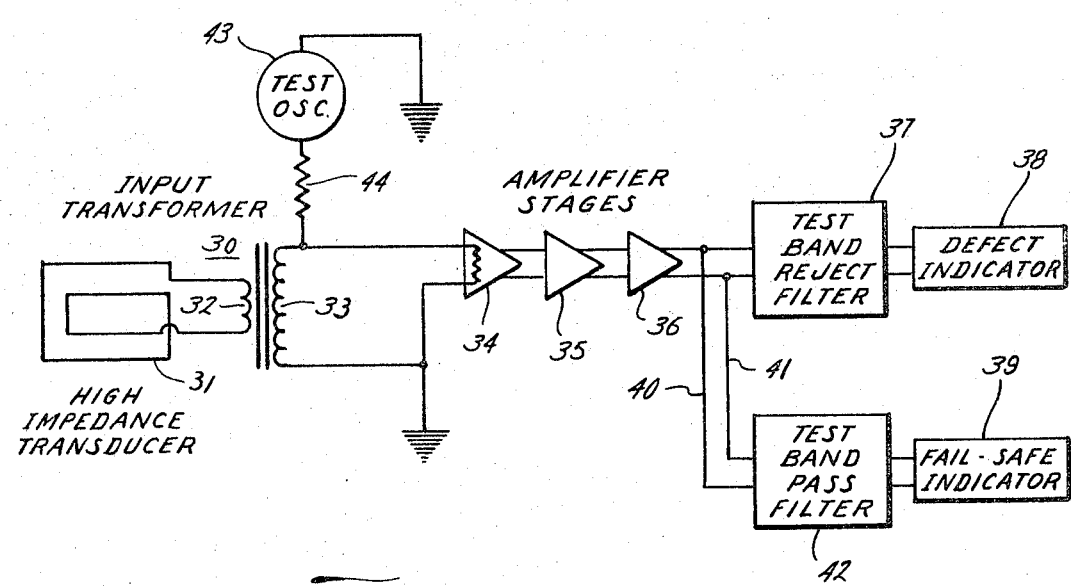
FIG. 2 is a block diagram, similar to FIG. 1, but showing another embodiment of the electrical circuit of the apparatus of this invention.

FIG. 2 shows an alternative arrangement of the invention. In this instance, the magnetic responsive means could be a relatively high impedance transducer or coil 31 which is connected to primary winding 32 of transformer 30. In this case, it may be said that defect signals detected by coil 31 are impresesd on primary winding 32 and are induced into secondary winding 33 of transformer 30. The output of secondary winding 33 is connected to an amplifier circuit which is similar to the amplifier circuit shown in FIG. 1, and is shown as amplifiers 34, 35 and 36 connected in series with the output thereof connected to test-band-reject filter 37 which is connected to defect indicator 38.

A second indicator in the form of fail safe indicator 39 is connected just ahead of filter 37 via leads 40, 41. Optionally indicator 39 may be connected through test-band pass filter 42.

In the embodiment shown in FIG. 2, the means for impressing a test signal on the amplifier circuit takes the form of test oscillator 43 which is connected to the amplifier circuit through resistor 44 and is *connected in parallel* with secondary winding 33.

In this embodiment primary winding 32 will normally reflect a high impedance into secondary winding 33 because of the high impedance in coil 31. By having test oscillator 43 connected parallel and by having resistor 44 with a high resistance, a small voltage test signal will normally be applied or impressed on the amplifier circuit.

However, if coil 31 should become short circuited, the impedance in primary winding 32 and in secondary winding 33 would be decreased, hence causing the test signal to be shunted through secondary winding 33, thus reducing the voltage of the test signal applied through amplifiers 34, 35 and 36. Moreover, if there is a failure in any of the amplifiers 34, 35 and 36, there will also be a reduction in test signal voltage. In the event of either type of failure, fail safe indicator 39 will be actuated in the same manner as indicator 25 in FIG. 1.

As long as the apparatus is operating properly test-band reject filter 37 will reject the test signals and defect indicator 38 will indicate only the defect signals detected by coil 31. As indicated above, defect indicator 38 may be an oscilloscope, strip chart, or other indicator means. Similarly, test-band reject filter 37 is selected to reject only the test signal frequencies and test-band pass filter 42 is selected to pass only test signal frequencies.

By way of example only, coil 31 may have an impedance of 200 ohms. Further, the number of turns in secondary winding 33 and in primary winding 32 may be on the order of a ratio of 50 to 1. Also, resistor 44 may have an impedance on the order of 10M ohms.

Both of the embodiments shown in FIGS. 1 and 2 utilize impedance matching transformers. FIG. 1 shows the use of a low impedance transducer or search coil which is so connected that a failure, such as an open circuit in the search coil, will automatically result in the immediate indication of this failure. FIG. 2 shows the use of a high impedance transducer, such as a multi-turn search coil, which is so connected and arranged that a failure, such as a short-circuit, will automatically be signaled.

In FIG. 1, the change from a normally low impedance to a high impedance, which occurs with an open circuit, is utilized to produce a decrease in the voltage of the test signal.

In FIG. 2, the change from a normally high impedance to a low impedance, which occurs with a short circuit, is utilized to produce a decrease in the voltage of the test signal.

Coincidentally, a failure of one or more of the amplifier stages will likewise result in a decrease of the test signal in both embodiments. Thus, both systems provide automatic checks on the operability of the transducer, as well as the amplifier circuit. This double check is an added safety feature of this invention.

There are, of course, many other alternatives which are available with this invention. For example, referring to FIG. 1, the test signal impressed by oscillator 15 could be of very low voltage and much lower than the voltage of any significant defect signal. In this instance, defect indicator 24 could be selected to be actuated only by significant defect signals above a preselected voltage and not actuated by the very small test signals. Similarly, indicator 25 could be selected to be activated by the very small voltage of the test signal.

With this arrangement filters 23 and 28 could be eliminated and the frequencies of the test signal and the defect signals could be in the same range of frequencies. In this embodiment the differentiation between the test signals and the defect signals would be on the basis of voltage and so long as indicator 25 was actuated by the low voltage test signals, it could be concluded that the system was working properly. When indicator 25 indicated that it was receiving no test signals, this would also indicate that there were no defect signals being detected by indicator 24, thereby indicaing the non-operability of the system. Nevertheless, this arrangement would still use an impedance matching transformer so connected as to result in a reduction in test signal voltage in case of non-operability.

This invention therefore provides an improved automatic fail-safe inspection device for inspecting metallic members such as pipe, wherein there is provided automatic means for immediately signaling the malfunctioning of the apparatus. This apparatus signals defective operation immediately and continuously, and hence gives a close check on the operation of the apparatus. The fail-safe indicator means does not interfere with the normal operation of the inspection portion of the apparatus. Further, the fail-safe indicator indicates not only failure of the transducer, and/or the transformer, but also any failure in the amplifier means, which is also a novel and added safety feature.

Further modifications may be made in the invention, as particularly described without departing from the scope of the invention. Accordingly, the foregoing description is to be construed illustrative only and is not to be construed as a limitation upon the invention as defined in the following claims.

What is claimed is:

1. An apparatus for inspecting a metallic member for defects and having automatic means for signaling the non-operability of the apparatus comprising:
   means for passing a magnetic field through a portion of said metallic member,
   magnetic-responsive means mounted for relative movement adjacent to said portion and producing electrical defect signals in response to variations in said magnetic field,
   a transformer having the primary winding thereof connected with said magnetic-responsive means,
   means for impressing an electrical test signal on an amplifier circuit,
   said amplifier circuit being connected to the secondary winding of said transformer and amplifying said defect signals and said test signals,
   a first indicator means connected to said amplifier circuit and responsive to said amplified defect signals, and
   a second indicator means connected to said amplifier circuit and responsive to a reduction in voltage of said amplified test signal for indicating the non-operability of said apparatus.

2. The apparatus as claimed in claim 1 wherein:
said secondary winding and said means for impressing a test signal are connected in series to said amplifier circuit.

3. The apparatus as claimed in claim 1 wherein:
said secondary winding and said means for impressing a test signal are connected in parallel.

4. The apparatus as claimed in claim 1 wherein:
said magnetizing means and said magnetic-responsive means is an eddy current inspection unit which is responsive to defects in said portion.

5. The apparatus as claimed in claim 1 wherein:
said magnetizing means and said magnetic-responsive means is a flux-leakage inspection unit which is responsive to defects in said portion.

6. The apparatus as claimed in claim 1 wherein:
said test signal is of a different frequency than said defect signals, and wherein
filter means are connected between said amplifier circuit and said first indicator for filtering said test signals from said defect signals.

7. The apparatus as claimed in claim 1 wherein:
said test signal is of a smaller voltage than the voltage of significant defect signals.

8. An apparatus for inspecting a member for defects and automatically signaling the non-operability of the apparatus, which member has a magnetic field passing through at least a portion thereof, said apparatus comprising:
   a magnetic-responsive search coil mounted or relative movement adjacent to said portion and producing electrical defect signals in response to variations in said magnetic field,
   a transformer having a primary winding connected to said coil,
   means for impressing an electrical test signal on an amplifier circuit, which test signal is of a different frequency than said defect signals,
   said amplifier circuit being connected to the secondary winding of said transformer and amplifying said defect signals and test signals impressed thereon,
   filter means connected to said amplifier circuit for filtering said test signal from said defect signal,
   a first indicator means connected to said filter means and responsive to said defect signals, and
   a second indicator means connected to said amplifier circuit and responsive to a reduction in voltage of said test signal for indicating the non-operability of said apparatus.

9. The apparatus as claimed in claim 8 wherein:
said secondary winding and said means for impressing said test signal are connected in series to said amplifier circuit.

10. The apparatus as claimed in claim 8 wherein:
said secondary winding and said means for impressing said test signal are connected in parallel.

11. An apparatus for inspecting metallic members for defects and for signaling the non-operability of the apparatus comprising:
- means for passing a magnetic field through a portion of said metallic member,
- magnetic-responsive means mounted for relative movement adjacent to said portion and producing electrical defect signals in response to variations in said magnetic field,
- an impedance matching transformer having the primary winding thereof connected to said magnetic-responsive means,
- an amplifier circuit connected to the secondary winding of said transformer,
- an electrical generator connected to said amplifier circuit for impressing test signals thereon, which test signals are of a different frequency than said defect signals,
- filter means connected to said amplifier circuit for filtering said amplified test signals from said amplified defect signals,
- a first indicator means connected to said filter means and responsive to said amplified defect signals, and
- a second indicator means connected to said amplifier circuit and responsive to a reduction in voltage of said amplified test signal for indicating the non-operability of said apparatus.

12. The apparatus as claimed in claim 11 wherein:
said secondary winding and said generator are connected in series to said amplifier circuit.

13. The apparatus as claimed in claim 11 wherein:
said secondary winding and said generator are connected in parallel to the input of said amplifier circuit.

References Cited by the Examiner

UNITED STATES PATENTS

| | | | |
|---|---|---|---|
| 1,782,462 | 11/1930 | Chappuzeau et al. | 324—37 |
| 1,954,975 | 4/1934 | Zuschlag | 324—37 |
| 1,998,952 | 4/1935 | Edgar et al. | 324—37 |
| 2,113,783 | 4/1938 | De Lanty | 324—37 |
| 2,315,434 | 3/1943 | Liebe | 179—175.31 |
| 2,942,178 | 6/1960 | Nerwin | 324—40 |
| 3,135,914 | 6/1964 | Callan et al. | 324—40 |

WALTER L. CARLSON, *Primary Examiner.*

R. J. CORCORAN, *Assistant Examiner.*